No. 790,460. PATENTED MAY 23, 1905.
W. E. H. SEARCY.
PLANTER AND FERTILIZER DISTRIBUTER.
APPLICATION FILED JULY 25, 1902. RENEWED FEB. 14, 1905.
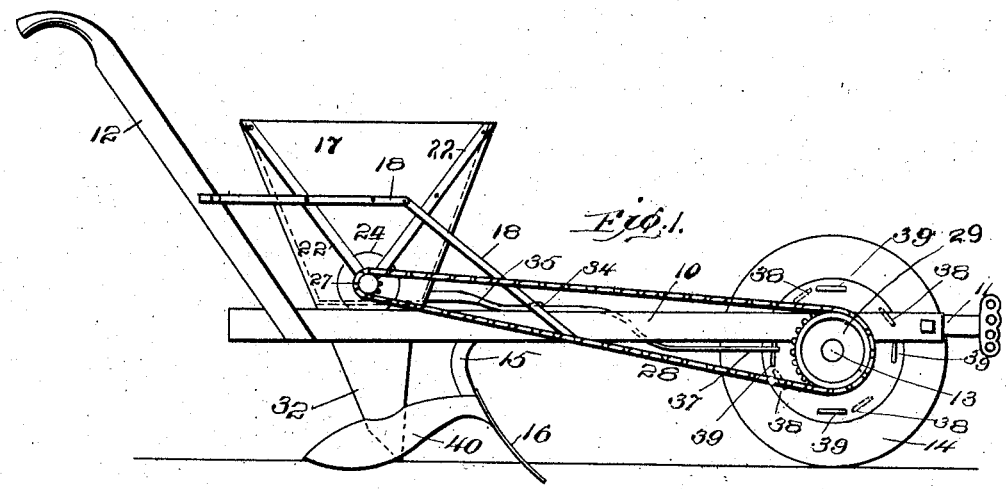
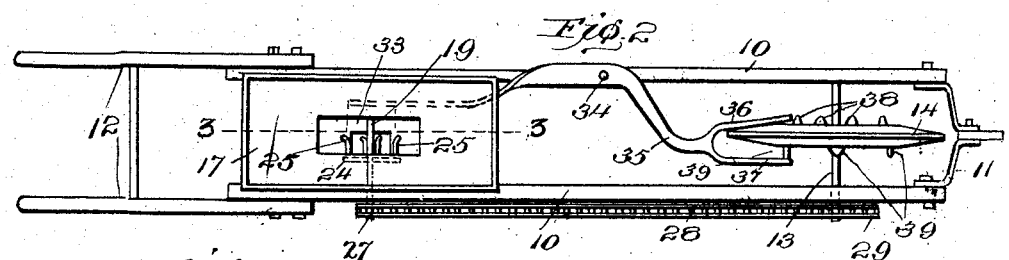
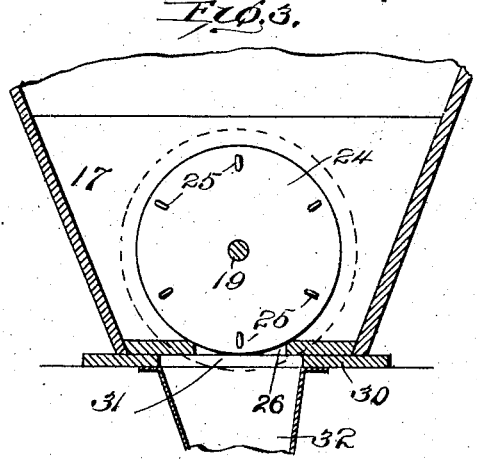
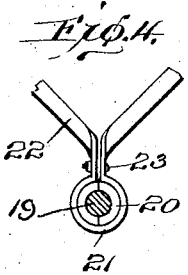
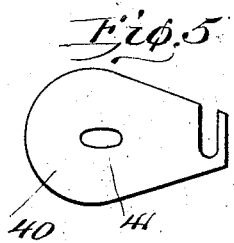
Witnesses
H. P. Hinkel.
J. H. Burgess.
Inventor
William E. H. Searcy,
By Grant Burroughs,
Attorney No. 790,460.  
Patented May 23, 1905.

UNITED STATES PATENT OFFICE.

WILLIAM EVERARD HAMILTON SEARCY, OF GRIFFIN, GEORGIA.

PLANTER AND FERTILIZER-DISTRIBUTER.

SPECIFICATION forming part of Letters Patent No. 790,460, dated May 23, 1905.

Application filed July 25, 1902. Renewed February 14, 1905. Serial No. 245,612.

*To all whom it may concern:*

Be it known that I, WILLIAM EVERARD HAMILTON SEARCY, a citizen of the United States, and a resident of Griffin, in the county of Spalding and State of Georgia, have invented certain new and useful Improvements in Planters and Fertilizer-Distributers, of which the following is a full, clear, and exact description, such as will enable those skilled in the art to which it appertains to make and use the same, reference being had to the accompanying drawings, forming a part of this specification.

The invention relates to improvements in planters and fertilizer-distributers of that class which consist, primarily, of a soil-opener, a hopper, and means for feeding the contents of the hopper into the furrow made by the soil-opener.

It consists in the novel construction, combination, and arrangement of parts, such as will be hereinafter fully described, pointed out in the appended claims, and illustrated in the accompanying drawings.

In the drawings, in which similar reference characters designate corresponding parts, Figure 1 is a side elevation of a device embodying the invention. Fig. 2 is a plan view of the same. Fig. 3 is an enlarged detail sectional view of the lower part of the hopper. Fig. 4 is a detail view showing one of the bearings for the stirrer-shaft. Fig. 5 is a plan view of the furrow-coverer.

The frame of the machine consists of the two parallel bars 10, connected at their front ends by the clevis-yoke 11. On the rear end of the frame are the usual handles 12. In suitable bearings secured to the under side of the frame near its forward end is journaled the shaft 13, and secured on the latter is the traction-wheel 14. Extending downwardly from the frame intermediate of its ends is the standard 15, having bolted to its lower extremity the soil-opening blade 16. The hopper 17 is mounted on the frame in advance of the handles and to the rear of the standard carrying the soil-opener. It is removably held in place by the shackles 18, detachably connected with the frame and the handles. In the lower part of the hopper and extending transversely across the same is the shaft 19, journaled at its ends in the bearing-blocks 20. The latter are clamped in the eyes 21 of the V-shaped hangers 22, secured on opposite sides of the hopper. By means of the bolts 23 the eyes can be tightened on the bearing-blocks to take up any wear. On the shaft 19 is the wheel 24, rotatable over a circular opening in the side of the hopper. Projecting from the inner face of the wheel through the circular opening in the side of the hopper are the stirrers 25, parallel with the shaft carrying the wheel. These stirrers extend about half-way across the hopper and have their ends bent outwardly, so that when the wheel is rotated the said ends will enter the aperture 26 in the bottom of the hopper. The shaft 19 is rotated by the sprocket-wheel 27, over which passes the chain 28, driven by the sprocket-wheel 29 on the shaft 13 of the traction-wheel.

Secured to the under side of the cross-piece 30, provided with the opening 31, registering with the aperture 26 in the bottom of the hopper, is the spout 32, directly beneath the opening 31. The lower end of the spout opens near the ground immediately in the rear of the opening-blade 16. The flow of the contents of the hopper to the spout is controlled by the slide or gate 33 movable back and forth across the aperture in the bottom of the hopper. Mechanism is provided for moving the gate back and forth. Pivoted intermediate of its ends, as at 34, to the frame is the lever 35. Its inner rear end is connected with the gate 33, and its outer front end is bifurcated and embraces the edge of the traction-wheel 14. The arms 36 and 37 of the bifurcation are respectively engaged by the cam-lugs 38 and 39 on opposite sides of the traction-wheel to oscillate the lever. The cam-lugs on each side of the wheel are circularly arranged, so as to successively strike their respective arms as the wheel is rotated. When the cam-lugs 38 strike the arm 36, the inner rear end of the lever is moved inwardly toward the hopper, and when the cam-lugs 39 strike the arm 37 the inner rear end of the lever is moved in the opposite direction away from the hopper. The cam-lugs on one side of the wheel alternate with those on the other side, so as to vibrate the lever. As the gate 33 is connected with the inner rear end of the lever, it will be intermittently moved back and forth to close and open the aperture in the bottom of the hopper. In order that the closing of the aperture may occur quickly after the opening of the same, the cam-lugs 39 are close behind the cam-lugs 38 on the opposite side of the wheel.

To the lower end of the standard 15 is secured the combined dirt-separator and furrow-coverer 40 by the same bolt that secures the opening-blade 16 in place, the coverer being clamped between the blade and the standard. This coverer is somewhat oval shape in outline and has convex and concave sides. It is attached at its more pointed end to the standard, the said end being bent and recessed for the purpose. When the coverer is in place, its convex side is uppermost and its forward end is elevated above the ground, while its concave side arches over the ground and its rear end contacts with the ground. At a central point, as at 41, is an aperture through which passes the spout 32, leading from the hopper, the spout opening into the furrow beneath the concave side of the coverer. The formation of the coverer is such as to prevent large clods or lumps that may be thrown up by the opening-blade from falling into the furrow before the spout empties into it, and at the same time the comparatively fine earth can pass beneath the forward end and be turned into the furrow by the comparatively broad rear end after the spout passes.

The operation of the device is as follows: The hopper is filled with seed, and the machine is propelled in the usual way. As the machine moves forward the wheel 24, carrying the stirrers 25, is rotated through the mechanism connecting it with the shaft of the traction-wheel 14. As the stirrers revolve in the hopper the seed is agitated, so as to fall to the bottom of the hopper. The rotation of the traction-wheel through the intervening mechanism reciprocates the gate 33, controlling the aperture in the bottom of the hopper, and permits the seed to fall intermittently into the spout 32. Owing to the close juxtaposition of the cam-lugs 38 to the cam-lugs 39 the opening of the gate is quickly followed by its closing. This limits the amount of seed that passes into the spout at each reciprocation of the gate. The seed is carried by the spout and deposited in the furrow, which is kept open by the coverer 40 until the seed is dropped. After the spout passes the broad rear edge of the coverer presses the dirt into the furrow over the seed.

The machine as herein described is adapted to the planting of smooth seed, which requires a comparatively quick opening and closing of the feed-gate in the bottom of the hopper; but by changes that would be within the scope of the invention it could be adapted to the planting of seed of different characters and to the distribution of fertilizer.

Having thus described my invention, what I claim, and desire to secure by Letters Patent, is—

1. In a planter and fertilizer-distributer, a hopper having an aperture in its bottom, a gate controlling said aperture, a pivoted lever connected at one end with said gate, a traction-wheel, cam-lugs on said wheel for engaging with said lever to vibrate the same and to reciprocate said gate, an opening-blade, a spout leading from said aperture in the bottom of the hopper and opening immediately to the rear of said blade, and a coverer extending to the rear of said blade and provided with an aperture through which passes the lower end of said spout.

2. In a planter and fertilizer-distributer, a hopper having an aperture in its bottom, a gate controlling said aperture, a pivoted lever connected at one end with said gate and having its other end bifurcated, a traction-wheel entering between the members of the bifurcation of said lever, cam-lugs on opposite sides of said wheel for engaging with the members of the bifurcation of the lever to vibrate the latter and to reciprocate said gate, an opening-blade, a spout leading from said aperture in the bottom of the hopper and opening immediately to the rear of said blade, and a coverer extending to the rear of said blade and provided with an aperture through which passes the lower end of said spout.

3. In a planter and fertilizer-distributer, a hopper having an aperture in its bottom, a gate controlling said aperture, a pivoted lever connected at one end with said gate and having its other end bifurcated, a traction-wheel entering between the members of the bifurcation of said lever, cam-lugs on opposite sides of said wheel for engaging with the members of the bifurcation of the lever and with the cam-lugs on one side alternating with those on the other and arranged so that the cam-lugs on one side follow immediately after those on the opposite side, an opening-blade, a spout leading from said aperture in the bottom of the hopper and opening immediately to the rear of said blade, and a coverer extending to the rear of said blade and provided with an aperture through which passes the lower end of said spout.

4. In a planter and fertilizer-distributer, a hopper having an aperture in its bottom, a gate controlling said aperture, means for reciprocating said gate, angular hangers secured to opposite sides of said hopper, bearing-blocks clamped in the corners of said hangers, a shaft journaled at its ends in said bearing-blocks, a wheel carried on said shaft, stirrers projecting from said wheel into said hopper, and means for rotating said shaft.

5. In a planter and fertilizer-distributer, a hopper having an aperture in its bottom and a circular opening in one side, a gate controlling said aperture, means for reciprocating said gate, an angular hanger secured to said hopper with its angle projecting over said circular opening, bearing-blocks clamped in the corner of said hanger, a shaft journaled in said bearing-blocks and concentric with said circular opening, a wheel on said shaft and extending over said circular opening, stirrers projecting from said wheel through said circular opening into said hopper, and means for rotating said shaft.

6. In a planter and fertilizer-distributer, a hopper having an aperture in its bottom, a gate controlling said aperture, a pivoted lever connected at one end with said gate and having its other end bifurcated, a traction-wheel entering between the members of the bifurcation of the lever, and cam-lugs on opposite sides of said wheel for engaging with the members of the bifurcation of the lever and with the cam-lugs on one side of the wheel alternating with those on the other side and arranged so that the cam-lugs on one side follow immediately after those on the other side.

In testimony whereof I hereunto affix my signature in presence of two witnesses.

WILLIAM EVERARD HAMILTON SEARCY.

Witnesses:
J. A. DREWRY,
WM. M. THOMAS.